United States Patent Office 3,236,888
Patented Feb. 22, 1966

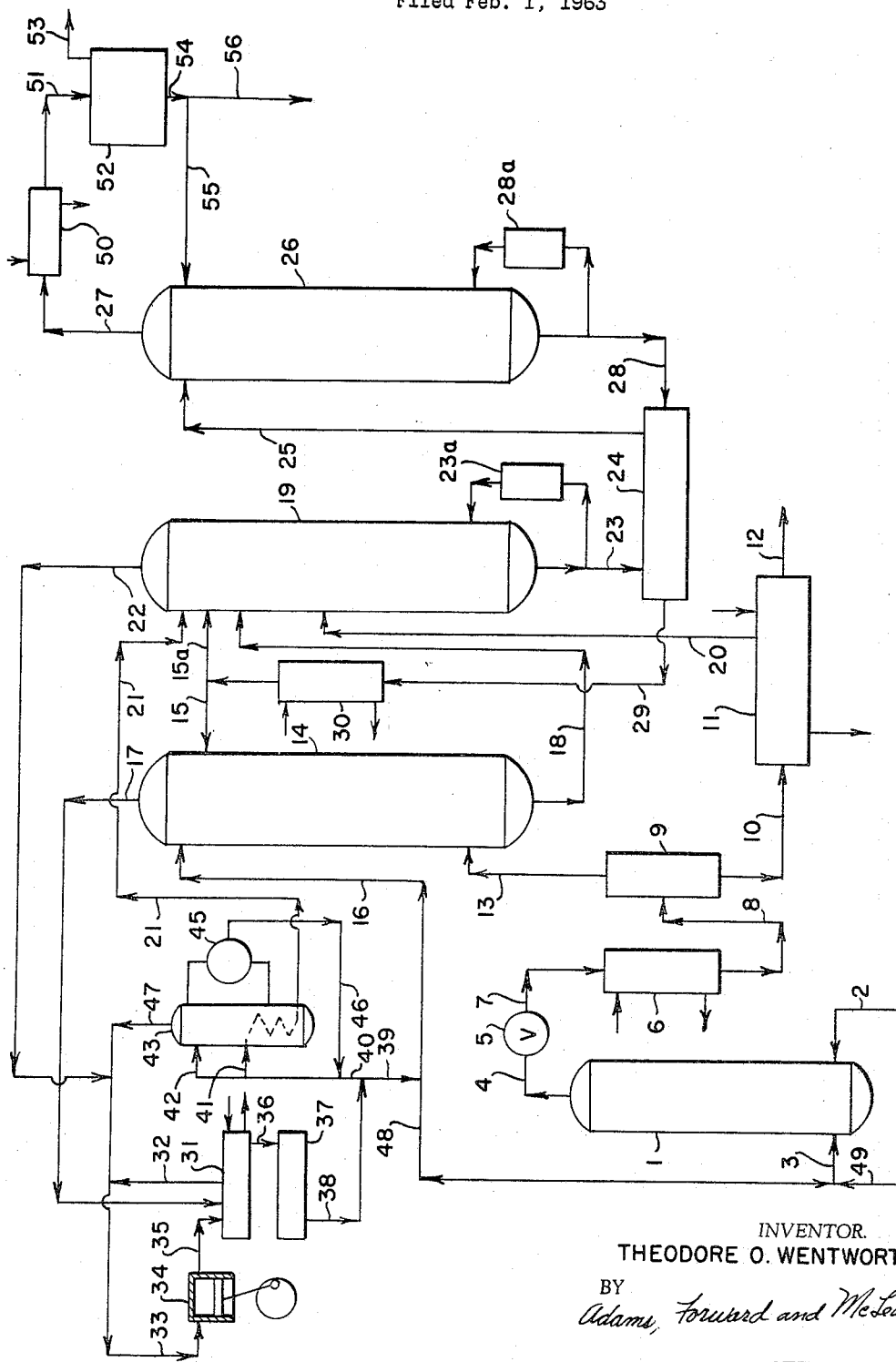

3,236,888
PRODUCTION OF UREA
Theodore O. Wentworth, Cincinnati, Ohio, assignor, by mesne assignments, to Allied Chemical Corporation, New York, N.Y., a corporation of New York
Filed Feb. 1, 1963, Ser. No. 255,447
6 Claims. (Cl. 260—555)

This invention relates to the production of urea from ammonia and carbon dioxide.

There are a number of commercial urea synthesis processes wherein urea is produced from ammonia and carbon dioxide which first react to form ammonium carbamate, the latter being converted to urea with the simultaneous formation of water. In this connection, see the article by W. H. Tonn, Jr. in "Chemical Engineering," October 1955, pages 186–190. These commercial processes all operate at conditions of relatively high temperatures of the order of 320° to 410° F. and pressures of the order of 1750 to 6000 p.s.i. and under such conditions the ammonium carbamate formed as an intermediate is extremely corrosive. Consequently the art is and has been concerned with means for overcoming this corrosion problem. Proposed solutions include lining the reaction equipment with lead or silver, lining the reaction equipment with or fabricating it from chromium-nickel steels, and introducing corrosion inhibiting substances with the reactants. Note, for example, U.S. Patent 2,727,069 to Van Waes.

According to the present invention, corrosion is minimized in urea synthesis processes wherein ammonia and carbon dioxide are reacted under conditions of relatively high temperatures and pressures to form a normally corrosive ammonium carbamate melt in apparatus having surfaces exposed to the reaction mixture by conducting the reaction in apparatus such that the surfaces thereof exposed to the reaction mixture is zirconium.

Although the process of this invention is applicable to any of the present commercial urea synthesis processes including a once-through operation, it is preferred to separate and recycle the ammonia and carbon dioxide components of the off-gas stream from the urea synthesis unit. Several methods of accomplishing the separation and recycle of ammonia and carbon dioxide are described in an article by L. H. Cook in "Chemical Engineering Progress," volume 50, No. 7, (July 1954) at pages 327–330. Other preferred methods of accomplishing the separation and recycle of ammonia and carbon dioxide are described in copending applications Serial Nos. 109,567 and 109,719, now U.S. Patent No. 3,107,149, both filed May 12, 1961, in the names of Theodore O. Wentworth and Lawrence W. Nisbet, Jr.

Thus, in accordance with the method of Serial No. 109,567, a gaseous mixture containing at least one mole of ammonia per mole of carbon dioxide at a pressure within the range of about 70 p.s.i.a. to about 280 p.s.i.a. is contacted with a liquid alkylolamine of at least 50 percent by weight concentration (the balance present being largely water) in a first contact stage wherein all the carbon dioxide is absorbed by the alkylolamine and sufficient liquid ammonia is introduced into the upper portion of the first contact stage to maintain the bottoms alkylolamine temperature at the maximum level precluding excessive alkylolamine degradation which would otherwise occur, the unabsorbed ammonia being removed from the first contact stage. The alkylolamine enriched with carbon dioxide and ammonia is removed from the first contact stage and passed to a second contact stage maintained at a pressure within the range of about 15 to 50 p.s.i.a. In the second contact stage ammonia is desorbed from the enriched alkylolamine, the ammonia gas being removed from the second stage. The alkylolamine enriched with carbon dioxide is removed from the second contact tsage and passed to a third stage wherein it is heated thereby liberating absorbed carbon dioxide, the liberated carbon dioxide being withdrawn from the third stage. The liquid alkylolamine substantially free of dissolved ammonia and carbon dioxide is then removed from the third stage.

Advantageously, the second contact stage is operated as a combination absorber-stripper and a second stream of a gaseous mixture containing ammonia and carbon dioxide is also passed into the second contact stage wherein the carbon dioxide is absorbed from the second stream.

While the molar ratio of ammonia to carbon dioxide in both of the streams can vary anywhere from about 95:1 to about 1:1, it is preferred that the molar ratio of ammonia to carbon dioxide in the first stream be about 20:1 to about 2:1 and where the second contact stage is operated as a combination absorber-stripper, that the molar ratio in the second stream be about 20:1 to about 1:1, preferably about 10:1 to about 1:1. Both the first and second stream can contain water vapor up to saturation. It is preferred, however, that the molar ratio of water to the total moles of ammonia and carbon dioxide in the first stream does not exceed about 0.25:1 and that the molar ratio of water to the total moles of ammonia and carbon dioxide in the second stream does not exceed about 2:1.

The alkylolamines suitable for employment in the method of Serial No. 109,567, and of this invention include mono-, di- and triethanolamine, propanolamine and the like. It has been found to be particularly advantageous to employ mono-ethanolamine.

In the process of U.S. Patent 2,727,069 mentioned above, where chromium-nickel steel surfaces are employed, the synthesis must be effected in the presence of from 0.1 to 3.0% by volume of oxygen based on the amount of carbon dioxide utilized. A number of advantages of the process of this invention flow from the fact that oxygen need not be added to the reaction system. One such advantage is that more efficient compressor and reactor volume utilization are realized. A further advantage of the process of the invention is that higher reaction temperatures can be employed, i.e. 380° F. to 450° F., without undue corrosion but with higher reaction rates and higher conversions per pass.

Another advantage occurs where the ammonia and carbon dioxide content of the off-gases from the ammonium carbamate decomposition are separated prior to recycle by means of an alkylolamine absorbent, such as mono-, di-, and triethanolamine, propanolamine, and the like, since it has been found that the presence of oxygen in such absorbent separation systems contributes to degradation of the alkylolamine absorbent.

A preferred embodiment of the process of this invention is illustrated in detail by the following example taken in connection with the accompanying drawing.

*Example I*

Referring to the accompanying drawing, the surfaces exposed to the reaction mixture in reactor 1, line 4 and valve 5 are constructed of commercially available zirconium containing the following alloying metals in the following percentages by weight: chromium, 0.1%; tin, 1.5%; iron, 0.14%; and nickel, 0.06%. High purity carbon dioxide is introduced into reactor 1 by means of line 2 in the amount of 16,082 pounds per hour and liquid ammonia in substantial excess over the stoichiometric quantity, i.e. 24,854 pounds per hour, is pumped in through line 3. The reactor operates under about 275 atmospheres pressure at about 400° F. The conversion to urea based upon carbon dioxide introduced to the reactor is about 76 percent per pass. The product stream flows from reactor 1 by way of line 4 through pressure let-down valve 5, which reduces the pressure to about 16 atmospheres, and then into the steam-heated primary exchanger 6 by way of line 7. In exchanger 6, under the reduced pressure, the carbamate dissociates into carbon dioxide and ammonia. The product stream leaves exchanger 6 by way of line 8 and enters separator 9 where the gases are flashed off and the residual carbamate is decomposed. From the separator 9, the crude urea stream is passed by way of line 10 to steam-heated concentrator 11 where the remaining gases are removed together with part of the water formed during the reaction. The crude urea solution containing 16,667 pounds per hour of urea and 3660 pounds per hour of water is withdrawn from concentrator 11 by way of line 12 and subjected to further processing (not shown) such as prilling or purification by crystallization from water.

Overhead from separator 9 there is withdrawn by way of line 13 and passed to the lower portion of high pressure absorber 14 a gas stream at a temperature of 240° to 280° F. and a pressure of 230 p.s.i.a. composed of 14,961 pounds per hour of ammonia; 3280 pounds per hour of carbon dioxide and 335 pounds per hour of water vapor. In absorber 14 the gases entering through line 13 are contacted countercurrently with a liquid stream composed of 29,918 pounds per hour of monoethanolamine, 143 pounds per hour of water and 108 pounds per hour of carbon dioxide entering the upper portion of absorber 14 by way of line 15. Also there is introduced at the top of absorber 14 by way of line 16 a stream of 2927 pounds per hour of liquid ammonia at 95° F. and withdrawn overhead from absorber 14 by way of line 17 at a temperature of 104° F. and 225 p.s.i.a. are 14,597 pounds per hour of ammonia.

Withdrawn as bottoms from absorber 14 by way of line 18 and passed to low pressure absorber 19 is a stream at a temperature of 275° F. composed of 29,918 pounds per hour of monoethanolamine, 478 pounds per hour of water, 3291 pounds per hour of ammonia, and 3388 pounds per hour of carbon dioxide. Entering the upper portion of absorber 19 through line 15a is a stream composed of 11,782 pounds per hour of monoethanolamine, 57 pounds per hour of water and 42 pounds per hour of carbon dioxide. Entering the lower portion of absorber 19 by way of line 20 from concentrator 11 at a temperature of 270° to 300° F. and a pressure of 25 p.s.i.a. is a stream containing 446 pounds per hour of ammonia, 580 pounds per hour of carbon dioxide and 1007 pounds per hour of water vapor. Also there is introduced at the top of absorber 19 by way of line 21 a stream of 1163 pounds per hour of liquid ammonia at 80° F. and withdrawn overhead from absorber 19 by way of line 22 at a temperature of −17° F. and a pressure of 20 p.s.i.a. are 4900 pounds per hour of ammonia.

Withdrawn as bottoms from absorber 19 by way of line 23 at a temperature of 275° F. maintained by reboiler 23a is a stream composed of 41,700 pounds per hour of monoethanolamine, 4010 pounds per hour of carbon dioxide, and 1542 pounds per hour of water. The stream of line 23 is passed through exchanger 24 wherein its temperature is raised to 310° F. and then it is introduced by way of line 25 into the upper portion of desorber 26. Overhead from desorber 26 are withdrawn by way of line 27 at a temperature of 198° F. and a pressure of 17.7 p.s.i.a. 3860 pounds per hour of carbon dioxide and 2592 pounds per hour of water. Withdrawn as bottoms from desorber 26 by means of line 28 and passed to exchanger 24 is a stream at a temperature of 350° F. composed of 41,700 pounds per hour of monoethanolamine, 200 pounds per hour of water and 150 pounds per hour of carbon dioxide. The temperature of the stream of line 28 is reduced by exchanger 24 to 310° F. and the stream of line 28 is then passed by way of line 29 to exchanger 30 wherein its temperature is further reduced to 110° F. and from whence it is passed by way of line 15 to absorbed 14 and line 15a to absorber 19. The carbon dioxide and water stream of line 27 is cooled in condenser 50 to 120° F. and discharged through line 51 into separator 52. The gaseous discharge from the separator through line 53 contains 3860 pounds per hour of carbon dioxide and 169 pounds per hour of water vapor. Water leaves separator 52 by way of line 54 which discharges into lines 55 and 56. Line 55 returns 1250 pounds per hour of water to desorber 26 as reflux. Line 56 discharges 1172 pounds per hour of water to waste.

The high pressure ammonia vapor in line 17 from absorber 14 is passed to condenser 31 in indirect heat exchange with cooling water where it is liquefied. Low pressure ammonia vapor in line 22 from absorber 19 is combined with ammonia vapor which leaves subcooler 43 by way of line 47 and with ammonia vapor vented from condenser 31 by way of line 32, and the combined stream passes by way of line 33 to compressor 34. The compressed ammonia vapor is passed to condenser 31 where it is liquefied. Liquid ammonia leaves condenser 31 by way of line 36 to receiver 37. Liquid ammonia leaves receiver 37 by way of line 38 which discharges into lines 39 and 40. Line 39 discharges into line 16, which passes liquid ammonia to the top of absorber 14, and into line 48 which returns 15,407 pounds per hour of liquid ammonia to the urea-synthesis unit. Make-up ammonia is provided through line 49.

The stream of liquid ammonia passing through line 40 is discharged into lines 41 and 42. Line 41 carries the liquid ammonia through subcooler 43 and thence by way of line 21 to absorber 19. The liquid ammonia which passes by way of line 42 into subcooler 43 flash vaporizes thus subcooling the liquid ammonia passing through the subcooler by way of line 41. Liquid level controller 45 maintains the level of liquid ammonia in subcooler 43 at a predetermined level by returning excess liquid to line 40 by way of line 46.

While the primary corrosion problem exists in the portion of the reaction system up to valve 5, some corrosion occurs in other parts of the system such as in lines 7 and 8, primary exchanger 6 and separator 9, and these can also be constructed of the same commercially available zirconium, although they can be constructed of austinitic stainless steel.

The zirconium used in accordance with my invention can be unalloyed or, as the example illustrates, alloyed with small amounts of other metals, the total amount of which does not exceed about 6 percent by weight and preferably does not exceed about 3 percent by weight. Among the unalloyed types of unalloyed zirconium which can be used are the following, the percentages being by weight:

| Grade | 11 | 12 | 21 |
|---|---|---|---|
| Zirconium (minimum), percent | | | 99.5 |
| Zirconium plus hafnium (minimum), percent | 99.5 | 99.5 | |
| Impurities (maximum), percent | | | |
| Iron plus chromium, percent | 0.2 | 0.05 | 0.17 |
| Nitrogen, percent | 0.01 | 0.01 | 0.007 |
| Hafnium, percent | | | 0.02 |
| Brinell hardness (maximum) | 165 | 150 | 150 |

In the grade designations used in the above table are those of Carborundum Metals Company. Grades 11 and 12 are for commercial applications and contain a small percentage of hafnium normally occurring in zirconium ores and differ only in purity. Grade 21 is essentially the same as grade 11 with the hafnium removed for nuclear applications. There appears to be no advantage in using the more expensive nuclear grade in the process of this invention. Also, in addition to the alloy used in the example, the following alloys are also useful, here again the percentages being by weight.

| Grade | 32 | 34 | 41 |
|---|---|---|---|
| | Zircaloy-2 | Zircaloy-4 | ATR |
| Tin | 1.5 | 1.5 | |
| Iron | 0.14 | 0.21 | |
| Chromium | 0.10 | 0.10 | |
| Nickel | 0.05 | | |
| Copper | | | 0.5 |
| Molybdenum | | | 0.5 |

The alloys of the above table are marketed by Westinghouse and were developed for application in pressurized-water nuclear reactors. Grade 41 was developed for use in gas-cooled nuclear reactors.

I claim:
1. In the synthesis of urea wherein ammonia and carbon dioxide are reacted under conditions of relatively high temperatures and pressures to form a normally corrosive ammonium carbamate melt in apparatus having surfaces exposed to the reaction mixture, the improvement which comprises conducting the reaction in apparatus constructed in such a manner that the surface thereof exposed to the reaction mixture is zirconium.

2. The process of claim 1 wherein the urea synthesis reaction temperature is 380° to 450° F.

3. In the synthesis of urea wherein ammonia and carbon dioxide are reacted under conditions of relatively high temperatures and pressures in a urea synthesis zone to form a normally corrosive ammonium carbamate melt in apparatus having surfaces exposed to the reaction mixture, and wherein ammonia and carbon dioxide are separated from off-gases from the urea synthesis zone by means of an alkylolamine absorbent and the ammonia recycled to the urea synthesis zone, the improvement which comprises conducting the reaction in apparatus constructed in such a manner that the surface thereof exposed to the reaction mixture is zirconium.

4. In the synthesis of urea wherein ammonia and carbon dioxide are reacted under conditions of relatively high temperatures and pressures in a urea synthesis zone to form a normally corrosive ammonium carbamate melt in apparatus having surfaces exposed to the reaction mixture, and wherein ammonia and carbon dioxide are separated from off-gases from the urea synthesis zone by means of an alkylolamine absorbent and recycled to the urea synthesis zone, the improvement which comprises conducting the reaction in apparatus constructed in such a manner that the surface thereof exposed to the reaction mixture is zirconium.

5. A method for the preparation of urea which comprises introducing ammonia and carbon dioxide in a molar ratio of at least 2:1 into a urea synthesis zone maintained at elevated conditions of temperature and pressure whereby a normally corrosive ammonium carbamate melt is formed as an intermediate and whereby a product stream containing urea, water vapor, ammonia and carbon dioxide is produced, separating from the product stream a first gaseous mixture having a pressure within the range from about 70 p.s.i.a. to about 280 p.s.i.a. and consisting essentially of ammonia, carbon dioxide and water vapor, the molar ratio of ammonia to carbon dioxide being within the range of from about 20:1 to about 2:1 and the amount of water vapor being up to the limit of saturation; separating from the product stream a second gaseous mixture having a pressure within the range from about 15 p.s.i.a. to about 50 p.s.i.a. and consisting essentially of ammonia, carbon dioxide and water vapor, the molar ratio of ammonia to carbon dioxide being within the range from about 10:1 to about 1:1 and the amount of water vapor being up to the limit of saturation; contacting the first gaseous mixture with a liquid alkylolamine of at least 50% by weight alkylolamine concentration in a first contact stage maintained at a pressure within the range of 70 p.s.i.a. to 280 p.s.i.a. wherein all the carbon dioxide and water are absorbed, introducing sufficient liquid ammonia int othe first contact stage to maintain the bottoms alkylolamine temperature at the maximum level precluding excessive alkylolamine degradation which would otherwise occur, removing unabsorbed ammonia gas from the first contact stage, removing the alkylolamine enriched with carbon dioxide, water and ammonia from the first contact stage, contacting the second gaseous mixture with both the enriched alkylolamine from the first contact stage and liquid alkylolamine of at least 50% by weight alkylolamine concentration in a second contact stage maintained at a pressure within the range of 15 p.s.i.a. to 50 p.s.i.a. wherein all the carbon dioxide and water are absorbed from the gaseous mixture and ammonia is desorbed from the enriched alkylolamine, removing ammonia gas from the second contact stage, removing the alkylolamine enriched with carbon dioxide and water from the second contact stage and passing it to a third stage and therein heating it whereby absorbed carbon dioxide and water vapor are liberated, withdrawing carbon dioxide gas and water vapor from the third stage, withdrawing liquid alkylolamine substantially free of water and carbon dioxide from the third stage, liquefying the ammonia removed from the first contact stage and the second contact stage and returning the liquid ammonia to the urea synthesis zone, the surfaces of the urea synthesis zone exposed to the ammonium carbamate melt being constructed of zirconium.

6. The process of claim 5 wherein the carbon dioxide gas and water vapor withdrawn from the third stage is passed to a carbon dioxide separation stage wherein the carbon dioxide gas is separated from the water vapor, and the carbon dioxide is removed from the separation stage and returned to the urea synthesis zone.

References Cited by the Examiner

Schemel, Materials Protection, July 1962, pages 20–26 at page 26.

NICHOLAS S. RIZZO, *Primary Examiner.*